(12) United States Patent
Batterson

(10) Patent No.: US 8,643,511 B1
(45) Date of Patent: Feb. 4, 2014

(54) SYSTEM AND METHOD FOR REMOTE MAIL DELIVERY NOTIFICATION

(71) Applicant: Robert Batterson, El Dorado Hills, CA (US)

(72) Inventor: Robert Batterson, El Dorado Hills, CA (US)

( * ) Notice: Subject to any disclaimer, the term of this patent is extended or adjusted under 35 U.S.C. 154(b) by 0 days.

(21) Appl. No.: 13/784,807

(22) Filed: Mar. 4, 2013

(51) Int. Cl.
G08G 1/123 (2006.01)

(52) U.S. Cl.
USPC ...... 340/989; 340/904; 340/994; 340/539.14; 340/539.15; 455/41.2; 455/90.1; 705/28

(58) Field of Classification Search
USPC .................. 340/539.14, 539.15, 569; 705/26
See application file for complete search history.

(56) References Cited

U.S. PATENT DOCUMENTS

| | | | |
|---|---|---|---|
| 3,707,260 A | 12/1972 | Gelineau | |
| 5,023,595 A | 6/1991 | Bennett | |
| 5,440,294 A | 8/1995 | Mercier | |
| 6,114,959 A | 9/2000 | Bennett | |
| 6,725,127 B2 | 4/2004 | Stevens | |
| 6,747,551 B1 * | 6/2004 | Smith | 340/433 |
| 6,859,722 B2 | 2/2005 | Jones | |
| 6,928,270 B2 * | 8/2005 | Tighe | 455/90.1 |
| 7,246,009 B2 | 7/2007 | Hamblen | |
| 7,786,862 B1 | 8/2010 | Campbell | |
| 7,843,340 B2 | 11/2010 | Davis | |
| 2003/0193413 A1 * | 10/2003 | Jones | 340/994 |
| 2003/0195814 A1 * | 10/2003 | Striemer | 705/26 |
| 2004/0243664 A1 * | 12/2004 | Horstemeyer | 709/200 |
| 2004/0252030 A1 * | 12/2004 | Trimble et al. | 340/825.36 |
| 2006/0285655 A1 | 12/2006 | Little | |
| 2007/0170237 A1 | 7/2007 | Neff | |
| 2007/0190943 A1 * | 8/2007 | Little | 455/41.2 |
| 2013/0147626 A1 * | 6/2013 | Hammoud | 340/569 |

* cited by examiner

Primary Examiner — George Bugg
Assistant Examiner — Sharmin Akhter
(74) Attorney, Agent, or Firm — Inventive Patent Law P.C.; Jim H. Salter

(57) ABSTRACT

Remote mail delivery notification is disclosed. Example embodiments include: providing a radio frequency (RF) transmitter on a mail delivery vehicle, the RF transmitter being configured to transmit a signal on a pre-determined frequency within a pre-determined transmitter proximity region; providing an RF receiver for a recipient of mail delivered by the mail delivery vehicle, the RF receiver being configured to receive a signal on the pre-determined frequency within a pre-determined receiver proximity region, the RF receiver including a mechanism for rendering an alert when the signal is received, the RF receiver further including a reset button to clear the alert and reset the RF receiver to receive a new signal; positioning the RF receiver so a central mailbox associated with the mail recipient is located within the receiver proximity region; and automatically activating an alert on the RF receiver when the mail delivery vehicle is located at the central mailbox.

7 Claims, 9 Drawing Sheets

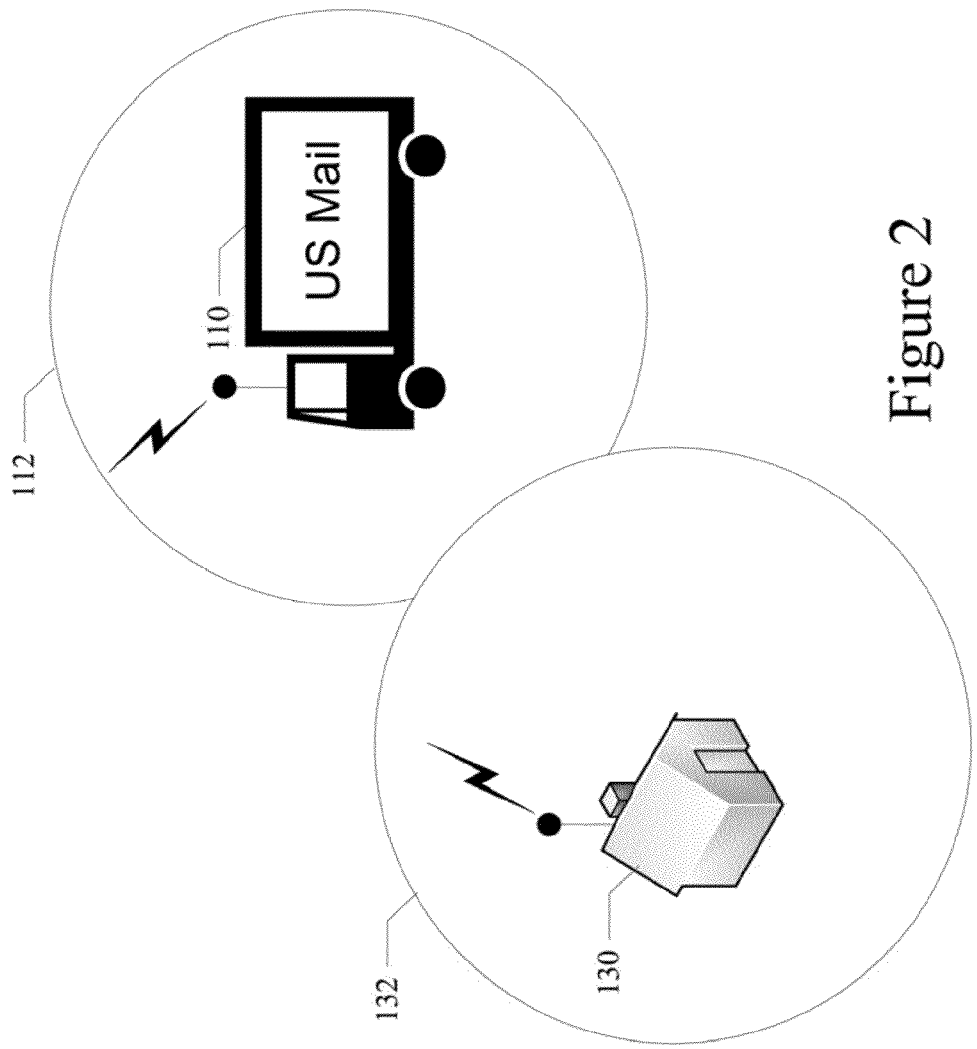

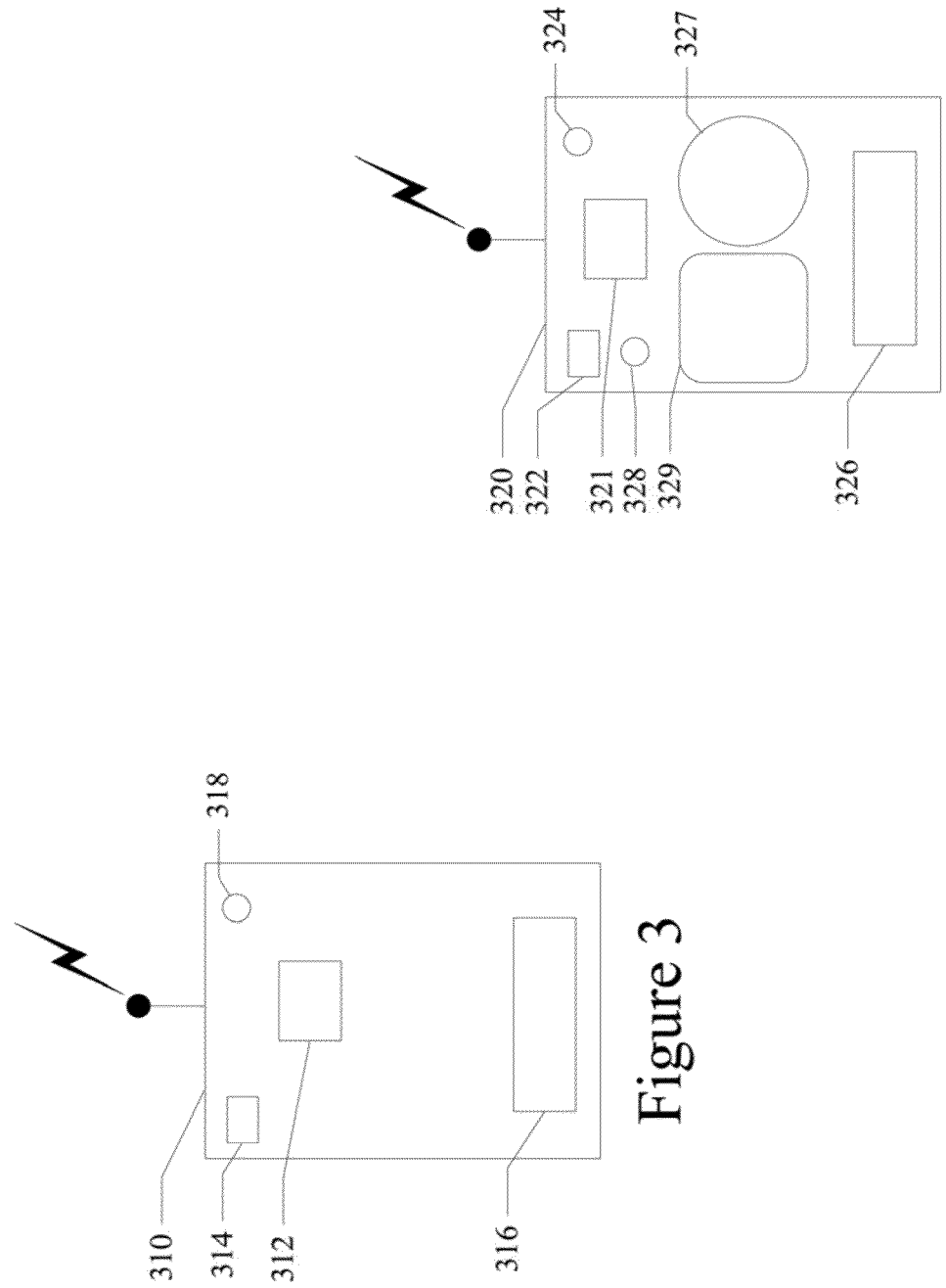

SYSTEM AND METHOD FOR REMOTE MAIL DELIVERY NOTIFICATION

BACKGROUND

1. Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the disclosure herein and to the drawings that form a part of this document: Copyright 2012-2013. Robert Batterson, All Rights Reserved.

2. Technical Field

This disclosure relates to delivery notification systems and methods, and more specifically, to a system and method for remote mail delivery notification.

3. Related Art

Presently, the U.S. Post Office has three basic types of delivery service: 1) door to door, 2) curbside, and 3) central mailboxes. Typically, notification in the context of a door-to-door delivery is not necessary, because the mail is delivered directly to the home or office. In the context of curbside delivery, several patents describe various systems for notification upon delivery to a curbside mailbox. The patents summarized below represent examples of curbside delivery notification. However, notification related to delivery to central mailboxes is not currently supported.

Central mailboxes are typically Post Office owned mailbox unit clusters that are positioned in neighborhoods or business complexes. Homeowners or business owners who live or work in the area are provided with as key by the Post Office to one of the mailbox units of the central mailbox nearest to them. Nevertheless, the central mailbox can be located some distance (e.g., hundreds of yards or many blocks away) from the home or office associated with the mail delivery at the central mailbox. In some cases, hilly or rough terrain can further lengthen the trip from the home or office to the central mailbox.

In many cases, a person may spend time looking or waiting for the mailperson, who delivers mail to the central mailbox, before the person makes the trip to the central mailbox to pick up the mail. If the person goes to the central mailbox and, in fact, the mailperson has not yet delivered the mail, the person has unnecessarily expended the effort to go to the central mailbox. This can be a frustrating experience and, for some people, very tiring or inconvenient.

U.S. Pat. No. 7,786,862 describes as method and system for remote notification of arrival of postal mail in a mailbox through a wireless transmitter and receiver. The system consists of a battery-powered motion sensor placed within an upper back portion of a standard, approved mailbox thereby to fastening means. When the mailbox door opens, the motion sensor is activated and automatically generates and transmits as wireless signal to a receiver located within as pre-determined proximity. The receiver is capable of providing both an audible and visual signal.

U.S. Pat. No. 7,843,340 describes as mail delivery alert system that includes a mailbox housing that encloses an interior space that defines an open front. A door is pivotally coupled to the housing and is movable between open and closed configurations relative to the open front. A first sensor is positioned in the housing so as to detect an opening of the door and a second sensor is positioned so as to detect the presence of an article, such as mail, in the open space of the housing. The system includes a transmitter and a processor. The processor includes programming for actuating the transmitter to transmit an alert signal through the air upon the first sensor detecting an opening of the door and the second sensor detecting the presence of an article in the open space of the housing. The system includes a receiver remote from the housing for receiving the alert signal.

BRIEF DESCRIPTION OF THE DRAWINGS

Embodiments illustrated by way of example and not limitation in the figures of the accompanying drawings, in which:

FIG. 2 illustrates the first example embodiment wherein the mail truck fitted with the RF transmitter that has a transmitter proximity region that intersects with a receiver proximity region of a radio frequency (RF) receiver thereby enabling the receiver to receive a signal from the transmitter of the mail truck;

FIG. 3 illustrates a sample RF transmitter in the first example embodiment;

FIG. 4 illustrates a sample RF receiver in the first example embodiment;

DETAILED DESCRIPTION

Figure 1:
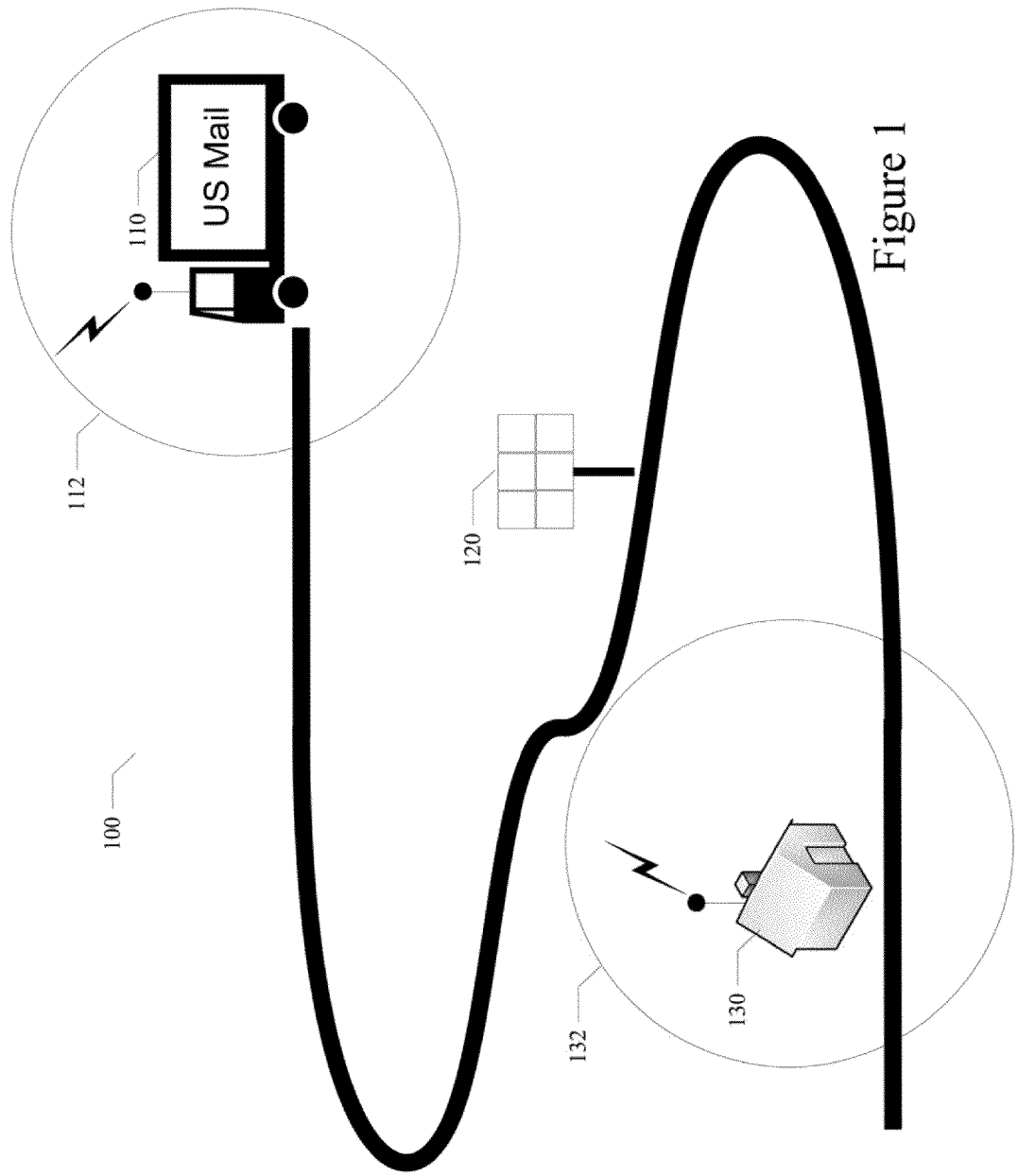
FIG. 1 illustrates a first example embodiment wherein a mail truck is fitted with (or has positioned therein) a radio frequency (RF) transmitter and moves through a community delivering mail to central mailboxes serving residents or business owners in the community with receivers.

A system and method for remote mail delivery notification are disclosed. However, it is understood that embodiments may be practiced without these specific details. In other instances, well-known processes, structures and techniques have not been shown in detail in order not to obscure the clarity of this description. Various embodiments are described below in connection with the figures provided herein.

In the various embodiments described herein, a system and method for remote mail delivery notification is provided. In a first embodiment, a standard mail truck (or other mail delivery vehicle) is fitted with (or has positioned therein) a radio frequency (RF) transmitter, which can transmit a signal on a pre-determined or pre-configured frequency. The mail truck can drive its standard route through a neighborhood or business area delivering mail to central mailboxes located in the neighborhood or business area. As the mail truck, and the transmitter therein, gets near to (i.e., within radio reception range of) a receiver operated by a homeowner or business owner in the neighborhood or business area, the receiver at the homeowner or business owner location receives the radio signal from the mail truck and causes an audible or visual alert to become activated. As a result, the homeowner or business owner receives notification that the mail has been delivered to the central mailboxes located in the neighborhood or business area.

In a second embodiment, each central mailbox is assigned a barcode or a Quick Response (QR) code. An image of the assigned barcode or QR code can be affixed to the housing of the central mailbox. The barcode or QR code can be associated with information identifying the homeowners or business owners who receive their mail from the particular central mailbox. The information identifying the homeowners or business owners can also include a phone number, email address. Twitter® handle. Facebook® identifier. Internet Protocol (IP) address, Uniform Resource Locator (URL), Skype® address, or other identifier, link, or address for a conventional electronic notification or communication system. This information for each homeowner or business owner (generally designated a subscriber) can be stored in a database at a central office (e.g. the nearest post office) or in the network cloud. Again, the mail truck can drive its standard route through as neighborhood or business area delivering mail to central mailboxes located in the neighborhood or business area. As the postal worker delivers the mail to a particular central mail box, the postal worker use to standard smartphone or other portable device to scan the barcode or QR code image affixed to the particular central mail box. As a result of this scanning, an application (app) running on the smartphone or other portable device automatically initiates a communication with the central office (e.g. the nearest post office) and sends a code associated with the scanned barcode or QR code to the central office. An app running at the central office can receive this communication and use the received barcode or QR code to perform a look-up in the database for all subscribers associated with the received barcode or QR code and the corresponding central mailbox. The app running at the central office can then access the database to obtain the identifier, link, or address associated with each subscriber (e.g., the subscriber's notice identifier) and can send subscriber-specified type of communication (notification) to the subscriber via conventional, networks to notify the subscriber that the mail has been delivered to the subscriber's central mailbox.

In a third embodiment, the central office (e.g. the nearest post office) maintains mailboxes at its location for homeowners or business owners residing or working in the local area. For example, most post offices provide post office boxes (P.O. boxes) at the post office for use by the community. The post office, or other provider of post office mail boxes, can further provide a notification system wherein the post office can use standard electronic communication systems to notify post office box owners that mail has been delivered to the post office box at the post office location. As part of this notification system, the post office collects information identifying the homeowners or business owners associated with each post office box. The post office further collects from each homeowner or business owner a phone number, email address. Twitter® handle, Facebook® identifier, Internet Protocol (IP) address, Uniform Resource Locator (URL), Skype® address, or other identifier, link, or address for a conventional electronic notification or communication system. This information for each homeowner or business owner (generally designated a subscriber) can be stored in a database at a central office (e.g. the nearest post office) or in the network cloud. When a postal worker at the post office has inserted the mail for a particular homeowner or business owner into a corresponding post office box, the postal worker can signal an app running at the central office to provide an indication that mail has been delivered to a particular post office box. As a result of receiving this indication, the app at the central office can perform a look-up in the database for the subscriber associated with the post office box. The app running at the central office can then access the identifier, link, or address associated with the subscriber and can send a subscriber-specified type of communication (notification) to the subscriber via conventional networks to notify the subscriber that the mail has been delivered to the subscriber's post office box.

Description of an Example Embodiment

Referring now to FIG. 1, a particular embodiment of the remote mail delivery notification system is illustrated. As shown in FIG. 1 for a first embodiment 100, a standard mail truck 110 can be fitted with for has positioned therein) a radio frequency (RF) transmitter, which can transmit a signal on a pre-determined or pre-configured frequency. The transmitter in the truck 110 can transmit to a limited distance from the truck 110 as represented by the transmitter proximity region 112. Radio receivers outside of this region 112 will be unable to receive the signal transmitted by the transmitter in the truck 110.

The mail truck 110 can drive its standard route through a neighborhood or business area delivering mail to central mailboxes 120 located in the neighborhood or business area. Typically, central mailboxes 120 provide a set of mail receptacles for a plurality of mail recipients who live or work in a neighborhood or business community. As the mail truck 110 moves through the neighborhood or business area, the transmitter therein gets near to (i.e., within radio reception range of) as receiver operated by a homeowner or business owner in the neighborhood or business area. As shown in FIG. 1, each of the plurality of mail recipients 130 who live or work in the neighborhood or business community can have a radio receiver tuned to a pre-configured frequency corresponding to the frequency on which the transmitter in truck 110 is transmitting. The receiver in the location 130 can receive an RF signal transmitted from a limited distance from the location 130 as represented by the receiver proximity region 132. Signals from radio transmitters outside of this region 132 will not be received by the receiver in the location 130. However, as truck 110 moves to a location near the location 130, the transmitter proximity region 112 intersects with the receiver proximity region 132 as shown in FIG. 2. When this intersection occurs, the receiver in the location 130 is able to receive a signal transmitted by the transmitter in truck 110. The receiver proximity area 132 of the receiver in the location 130 can be configured to include the location of the central mailbox 120 located in the neighborhood or business area associated with location 130. When the receiver in the location 130 receives the signal from the truck 110, an audible or visual alert can be activated at location 130. As described in more detail below in connection with FIG. 4, the receiver in the location 130 can include a variety of mechanisms for rendering audible or visual alerts. As a result, the homeowner or business owner at location 130 receives notification (via a wireless RF signal) that the mail has been delivered by truck 110 to the central mailbox 120 located in the neighborhood or business area and associated with location 130.

Referring now to FIGS. 3 and 4, an example RF transmitter (FIG. 3) and an example RF receiver (FIG. 4) is illustrated for the first embodiment of the present invention. Referring to FIG. 3, a transmitter 310 can include as standard RF transmitter module 312, which can be configured to transmit a wireless RF signal on a particular pre-determined frequency to a range defined by the transmitter proximity region 112. In an alternative embodiment, the transmitter module 312 can be configured to use well-known frequency hopping or coded signal transmissions. The transmitter module 312 can be powered by a battery (or other power source) 316, which can be engaged to drive the transmitter module 312 by power switch 314. The transmitter 310 can also include a visual indicator (e.g., a light emitting diode) 318 to indicate that the transmitter module 312 is powered or transmitting an RF signal. It will be apparent to those of ordinary skill in the art that transmitter 310 can be configured in a variety of ways to include other features.

Referring now to FIG. 4, a receiver 320 in an example embodiment can include a standard RF receiver module 321, which can be configured to receive a wireless RF signal on a particular pre-determined frequency from a range defined by the receiver proximity region 132. In an alternative embodiment, the receiver module 321 can be configured to use well-known frequency hopping or coded signal receptions. The receiver module 321 can be powered by a battery for other power source) 326, which can be engaged to drive the receiver module 321 by power switch 322. The receiver 320 can also include a visual indicator (e.g., a light emitting diode—LED) 324 to indicate that the receiver module 321 is powered or enabled to receive an RF signal. The receiver 320 can also include a visual alert rendering module 329 and/or an audible alert rendering module 327. The visual alert rendering module 329 can be as simple as a single LED. Alternatively, the visual alert rendering module 329 can include one or more lines of visual display elements to display an alphanumeric message. The audible alert rendering module 327 can be a speaker and a mechanism to emit an audible sound through the speaker. The receiver 320 can be configured to render a visual alert via the visual alert rendering module 329 when the receiver module 321 receives an RF signal from the transmitter 310. The receiver 320 can also be configured to render an audible alert via the audible alert rendering module 327 when the receiver module 321 receives an RF signal from the transmitter 310. The visual and/or audible alert can be activated continuously or for a pre-determined length of time. A reset button 328 can be used to clear the alert and reset the receiver 320 to receive a new RF signal. It will be apparent to those of ordinary skill in the art that receiver 320 can be configured in a variety of ways to include other features.

Figure 5:
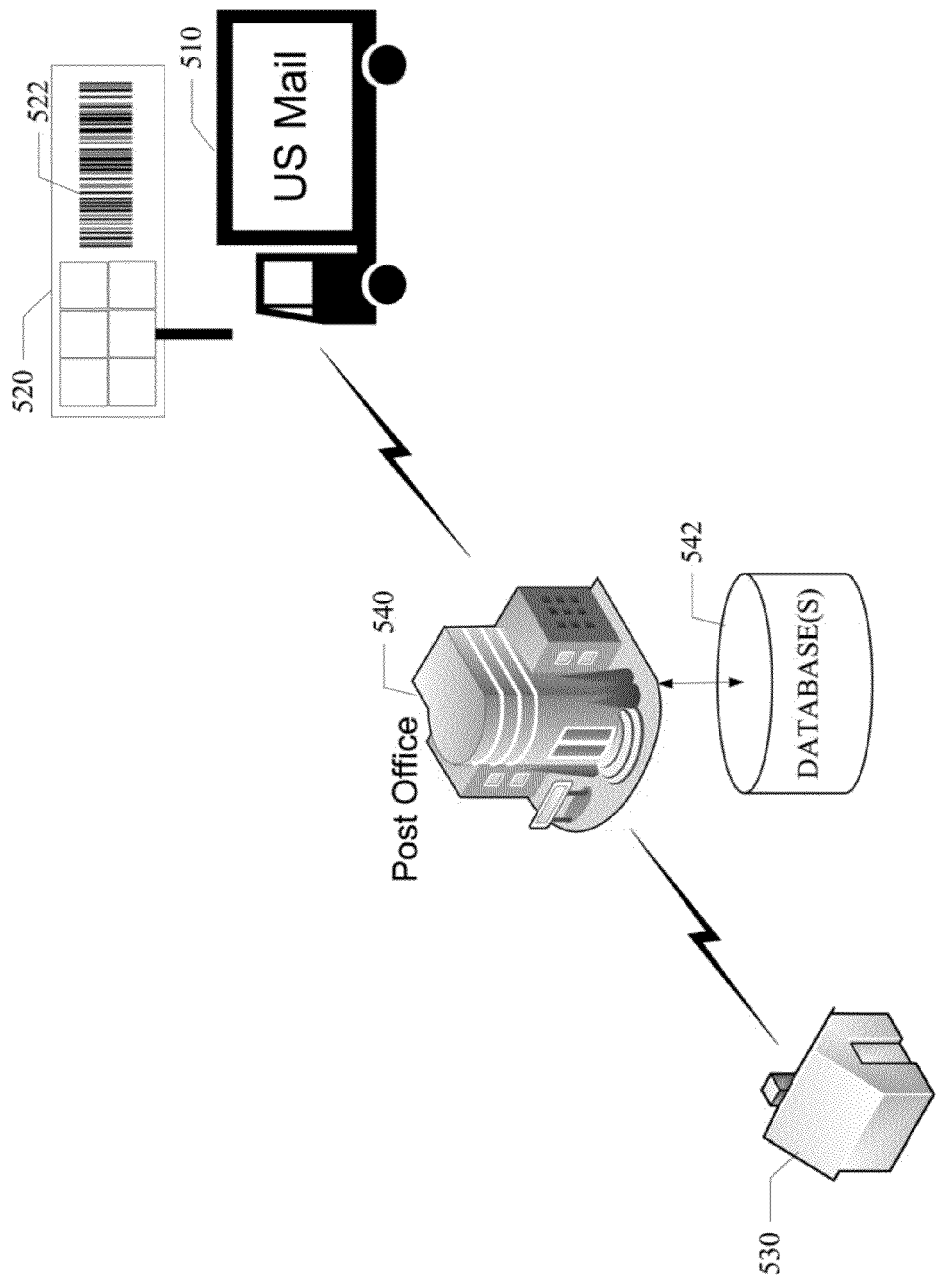
FIG. 5 illustrates a second example embodiment wherein a central mailbox is associated with a barcode or Quick Response (QR) code, which can be used to cause a notification to be sent to a subscriber via conventional electronic communication systems.

Referring now to FIG. 5 in a second embodiment, each central mailbox 520 can be assigned a barcode or a Quick Response (QR) code (or other scannable code). QR code (abbreviated from Quick Response Code) is the name of a type of matrix barcode (or two-dimensional barcode) first designed for the automotive industry in Japan. Barcodes are optical machine-readable labels attached to items that record information related to the item. The QR Code system has become popular due to its fast readability and greater storage capacity compared to standard barcodes. In the second embodiment, an image of the assigned barcode or QR code 522 can be affixed to the housing of the central mailbox 520. In one embodiment, the barcode image 522 can be printed on a sticky label and the label can get affixed to the central mailbox 520. The barcode corresponds to a unique number in a Post Office database 542 as the barcode is assigned to the particular central mailbox 520. Each time a resident or business owner 530 located near the central mailbox 520 moves in or out of the service area, the resident or business owner registers with the Post Office. Upon registration, the Post Office assigns the unique barcode number of the central mailbox 520 to the new resident or business owner 530 in the database 542. The resident or business owner 530 can also select whether they want to get notification via, text message, email, telephone call, etc. The barcode image 522 on the sticky label on the central mailbox 520 doesn't change. Only the database entries change when a resident or business owner 530 moves in or out of the service area or changes their notification preferences. The resident or business owner 530 can even make these changes themselves via a Post Office website or a third party website.

The barcode or QR code 522 can be associated with information identifying the homeowners or business owners 530 who receive their mail from the particular central mailbox 520. The information identifying the homeowners or business owners 530 can also include a phone number, email address, Twitter® handle, Facebook® identifier, Internet Protocol (IP) address, Uniform Resource Locator (URL), Skype® address, or other identifier, link, or address for a conventional electronic notification or communication system. This information for each homeowner or business owner (generally designated a subscriber) 530 can be stored in the database 542 at a central office the nearest post office) or in the network cloud.

Once the barcodes or QR codes are configured as described above, the mail truck 510 can drive its standard route through a neighborhood or business area delivering mail to central mailboxes (e.g., central mail box 520) located in the neighborhood or business area. As the postal worker in mail truck 510 delivers the mail to a particular central mail box 520, the postal worker uses a standard smartphone or other portable device to scan the barcode or QR code image 522 affixed to the particular central mail box 520. As a result of this scanning, a software application (app) running on the smartphone or other portable device automatically initiates a communication with the central office 540 (e.g. the nearest post office) and sends a code associated with the scanned barcode or QR code to the central office 540. An app running at the central office 540 can receive this communication and use the received barcode or QR code to perform a look-up in the database 542 for all subscribers associated with the received barcode or QR code and the corresponding central mailbox 520. The app running at the central office 540 can then access the database 542 to obtain the identifier, link, or address associated with each subscriber (e.g., the subscriber's notice identifier) 530 associated with the corresponding central mailbox 520. The details of the information maintained in database 542 for each subscriber and each central mailbox 520 in an example embodiment are described below in connection with FIG. 6. The app running at the central office 540 can send a subscriber-specified type of communication (notification) to each subscriber 530 via conventional networks to notify the subscriber 530 that the mail has been delivered to the subscriber's central mailbox 520.

Figure 6:
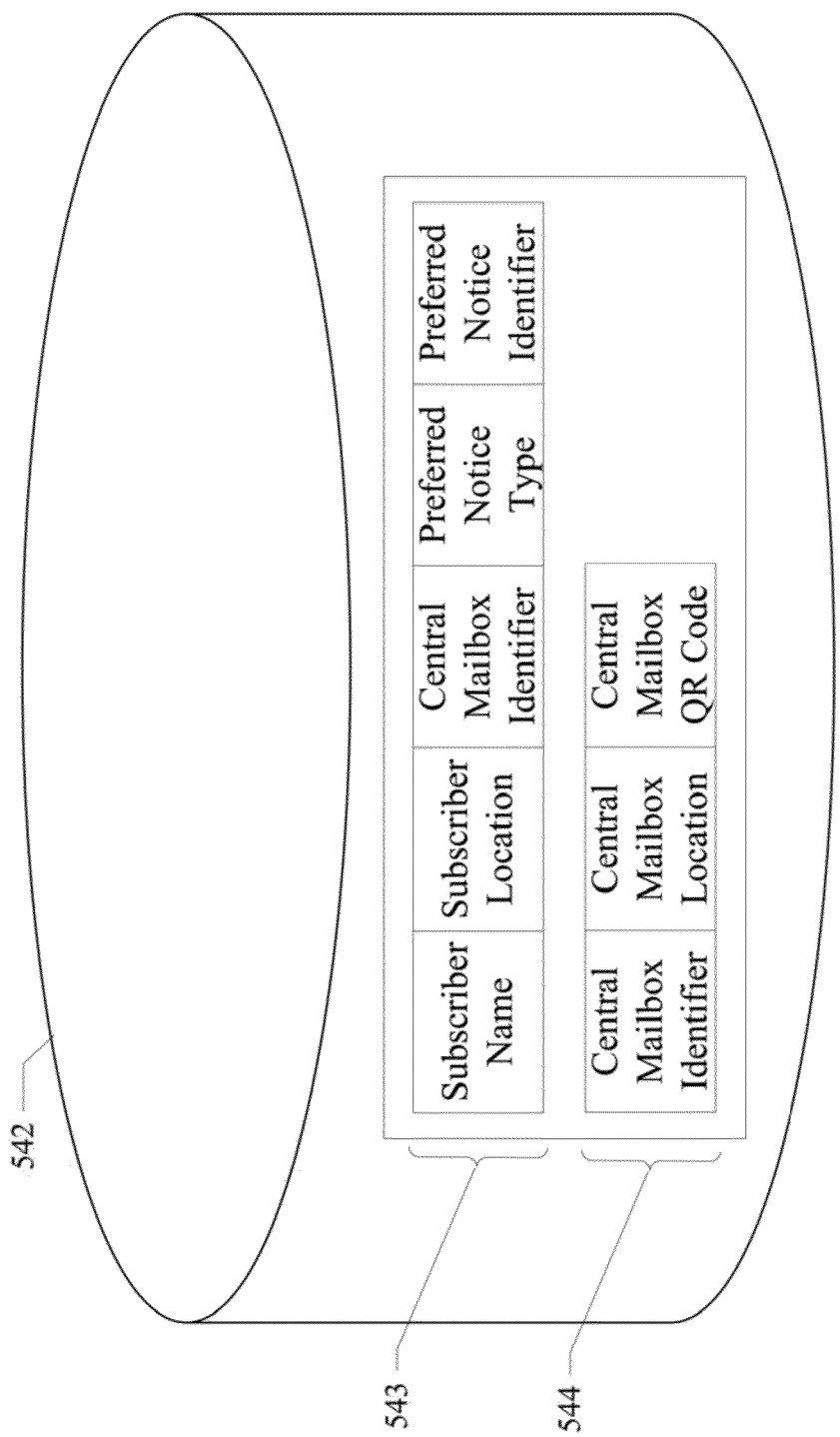
FIG. 6 illustrates a sample of content in a database in the second example embodiment.

Referring now to FIG. 6, the details of the information maintained in database 542 for each subscriber and each central mailbox 520 in an example embodiment are illustrated. As shown, the database 542 at a central office 540 can include subscriber information 543 for each subscriber and mailbox information 544 for each central mailbox. The subscriber information 543 can include the subscriber name or identifier, subscriber location or address, the central mailbox identifier associated with (proximate to) the particular subscriber, the preferred notice type (e.g., how the subscriber wants to be notified of as new mail delivery), and a preferred notice identifier (e.g., a phone number, email address, Twitter® handle, Facebook® identifier, Internet Protocol (IP) address. Uniform Resource Locator (URL), Skype® address, or other identifier, link, or address for a conventional electronic notification or communication system). The mailbox information 544 can include the central mailbox identifier, the central mailbox location, and the barcode or QR code associated with the particular central mailbox. The central mailbox identifier can be used as a key into the subscriber information 543 and the mailbox information 544.

Figure 7:
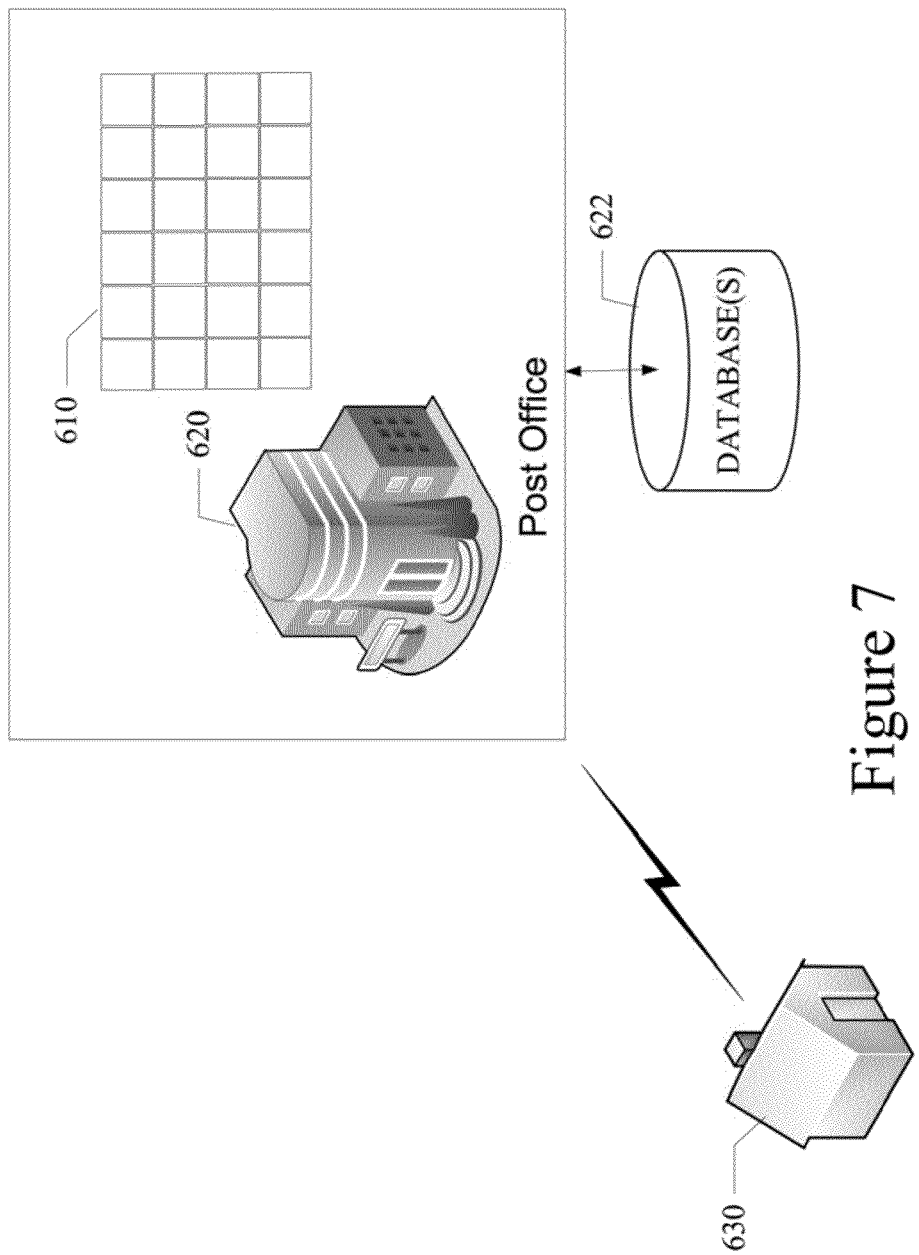
FIG. 7 illustrates a third example embodiment wherein a post office maintains post office boxes and sends a notification subscribers via conventional electronic communication systems.

Referring now to FIG. 7, a diagram illustrates a third example embodiment of the present invention. In the third embodiment, the central office (e.g. the nearest post office) 620 maintains mailboxes 610 at the central office 620 location for homeowners or business owners residing or working in the local area. For example, most post offices provide post office boxes (e.g., P.O. boxes) at the post office for use by the community. The central office 620, or other provider of post office mail boxes 610, can further provide a notification system wherein the central office 620 can use standard electronic communication systems to notify post office box owners 630 that mail has been delivered to their post office box 610 at the central office 620 location. As pan of this notification system, the central office 620 collects information identifying the homeowners or business owners 630 associated with each post office box 610. The central office 620 further collects from each homeowner or business owner 630 a phone number, email address. Twitter® handle, Facebook® identifier, Internet Protocol (IP) address, Uniform Resource Locator (URL), Skype® address, or other identifier, link, or address for to conventional electronic notification or communication system. This information for each homeowner or business owner (generally designated as subscriber) 630 can be stored in a database 622 at the central office 620 or in the network cloud. When a postal worker at the central office 620 has inserted the mail for a particular homeowner or business owner 630 into a corresponding post office box 610, the postal worker can signal an app running at the central office 620 to provide an indication that mail has been delivered to a particular post office box 610. As a result of receiving this indication, the app at the central office 620 can perform a look-up in the database 622 for the subscriber 630 associated with the post office box 610. The app running at the central office 620 can then access the identifier, link, or address associated with the subscriber 630 and can send a subscriber-specified type of communication (notification) to the subscriber 630 via conventional networks to notify the subscriber 630 that their mail has been delivered to the subscriber's post office box 610.

Figure 8:
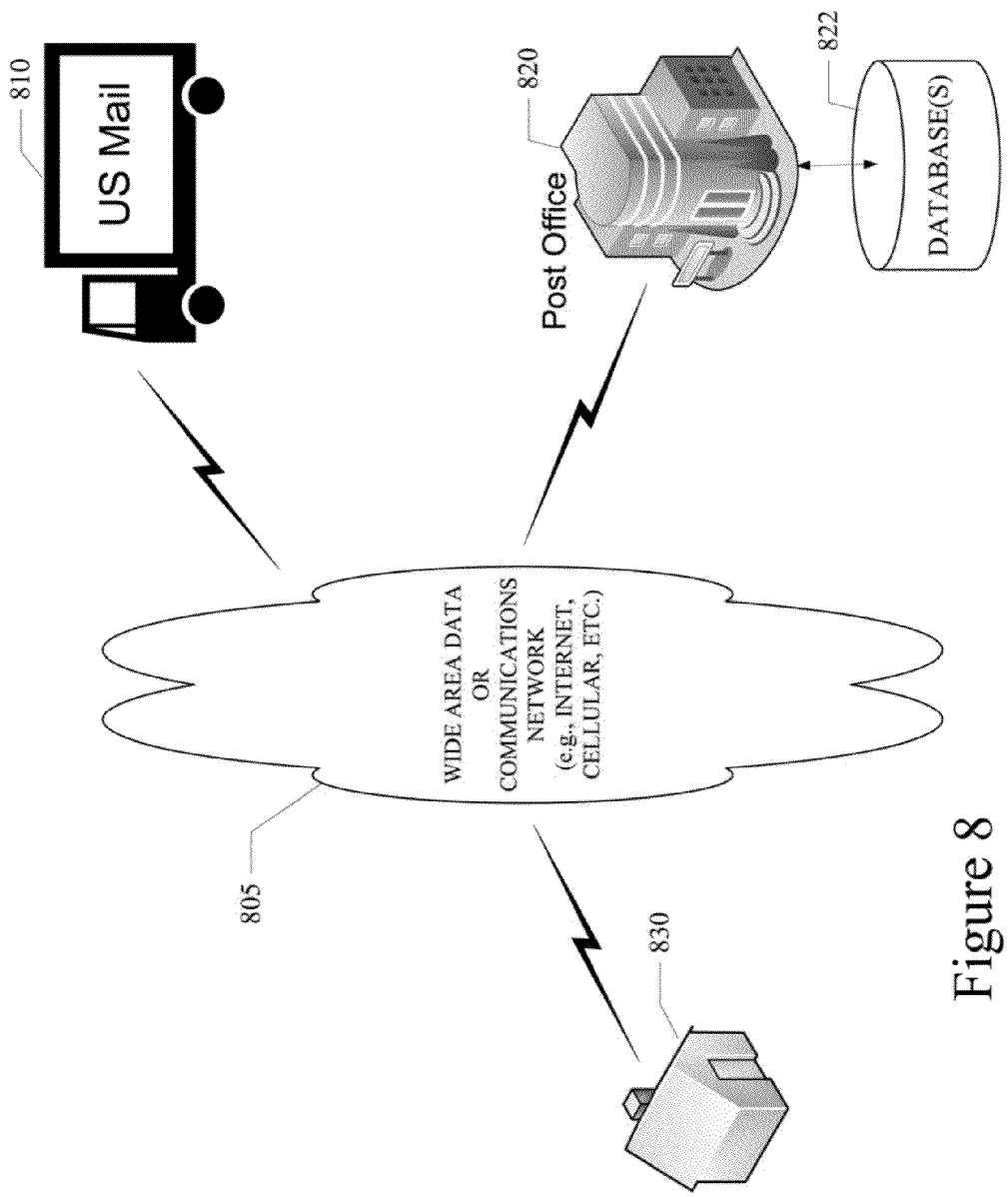
FIG. 8 illustrates how various embodiments can communicate via conventional wide area data networks or communication networks.

FIG. 8 illustrates how various embodiments can communicate via conventional wide area data networks or communication networks 805. For example, network 805 can be configured to couple one computing device with another computing device. Such computing devices can include mobile devices (e.g., mobile telephones or personal digital assistants) used by a postal worker in a mail truck 810, a postal worker or app at a central office 820, or a mobile device used by a homeowner or business owner 830. Network 805 may be enabled to employ any form of computer readable media for communicating information from one electronic device to another. Network 805 can include the Internet in addition to other wide area networks (WANs), direct connections, such as through a universal serial bus (USB) port, other forms of computer-readable media, or any combination thereof. On an interconnected set of local area networks (LANs), including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth, satellite, or modem and temporary telephone link.

Network 805 may further include any of a variety of wireless networks or sub-networks that may further overlay stand-alone ad-hoc networks, and the like, to provide an infrastructure-oriented connection. Such networks or sub-networks may include mesh networks, Wireless LAN (WLAN) networks, cellular networks, and the like. Network 805 may also include an autonomous system of terminals, gateways, routers, and the like connected by wireless radio links or wireless transceivers. These connectors may be configured to move freely and randomly and organize themselves arbitrarily, such that the topology of network 805 may change rapidly and arbitrarily.

Network 805 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, network 805 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Network 805 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, network 805 may include virtually any wired and/or wireless communication mechanisms by which information may travel between one computing device and another computing device, network, and the like.

Figure 9:
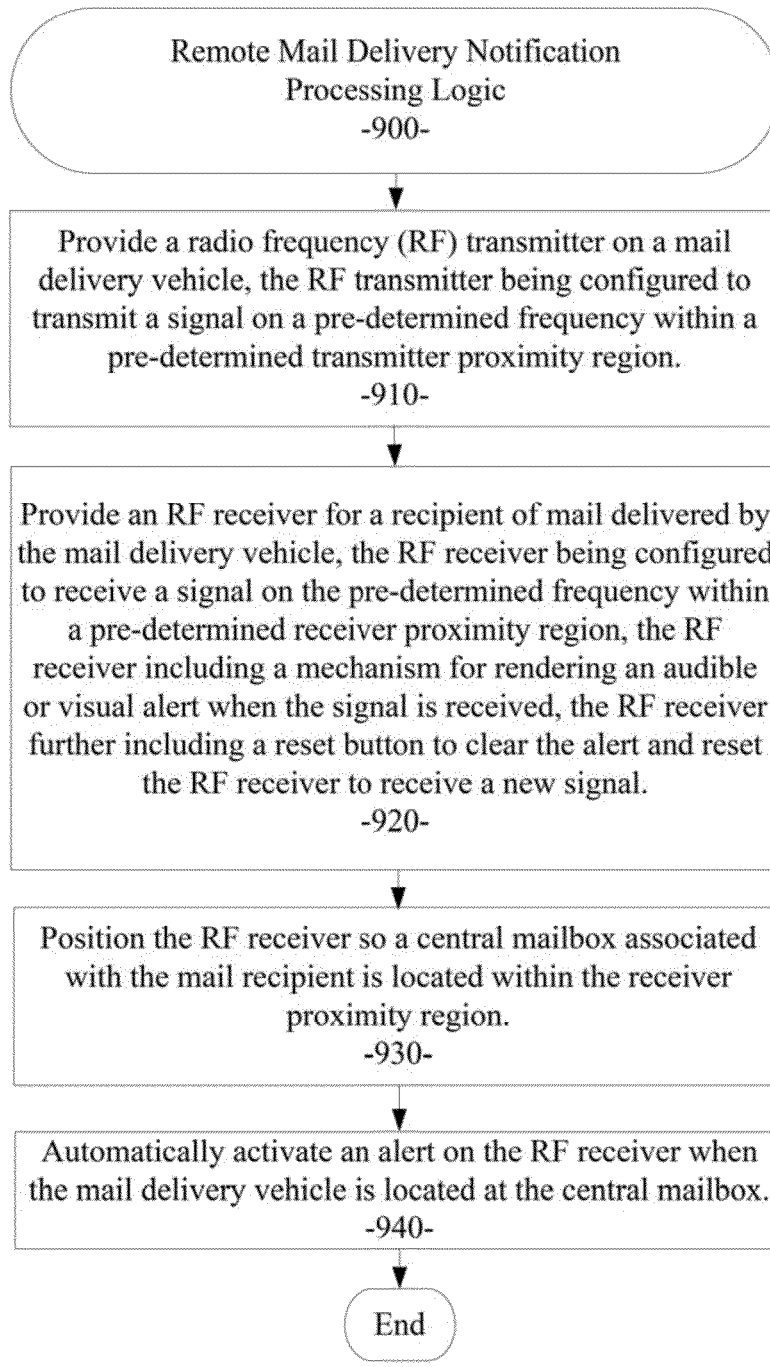
FIG. 9 is a processing flow chart illustrating an example embodiment of a method for remote mail delivery notification as described herein.

Referring now to FIG. 9, a processing flow diagram illustrates an example embodiment of a remote mail delivery notification system as described herein. The method 900 of an example embodiment includes: providing a radio frequency (RF) transmitter on a mail delivery vehicle, the RF transmitter being configured to transmit a signal on a pre-determined frequency within a pre-determined transmitter proximity region (processing block 910); providing an RF receiver for a recipient of mail delivered by the mail delivery vehicle, the RF receiver being configured to receive a signal on the pre-determined frequency within as pre-determined receiver proximity region, the RF receiver including a mechanism for rendering an audible or visual alert when the signal is received, the RF receiver further including a reset button to clear the alert and reset the RF receiver to receive a new signal (processing block 920); positioning the RF receiver so a central mailbox associated with the mail recipient is located within the receiver proximity region (processing block 930);

and automatically activating an alert on the RF receiver when the mail delivery vehicle is located at the central mailbox. (processing block 940).

Figure 10:
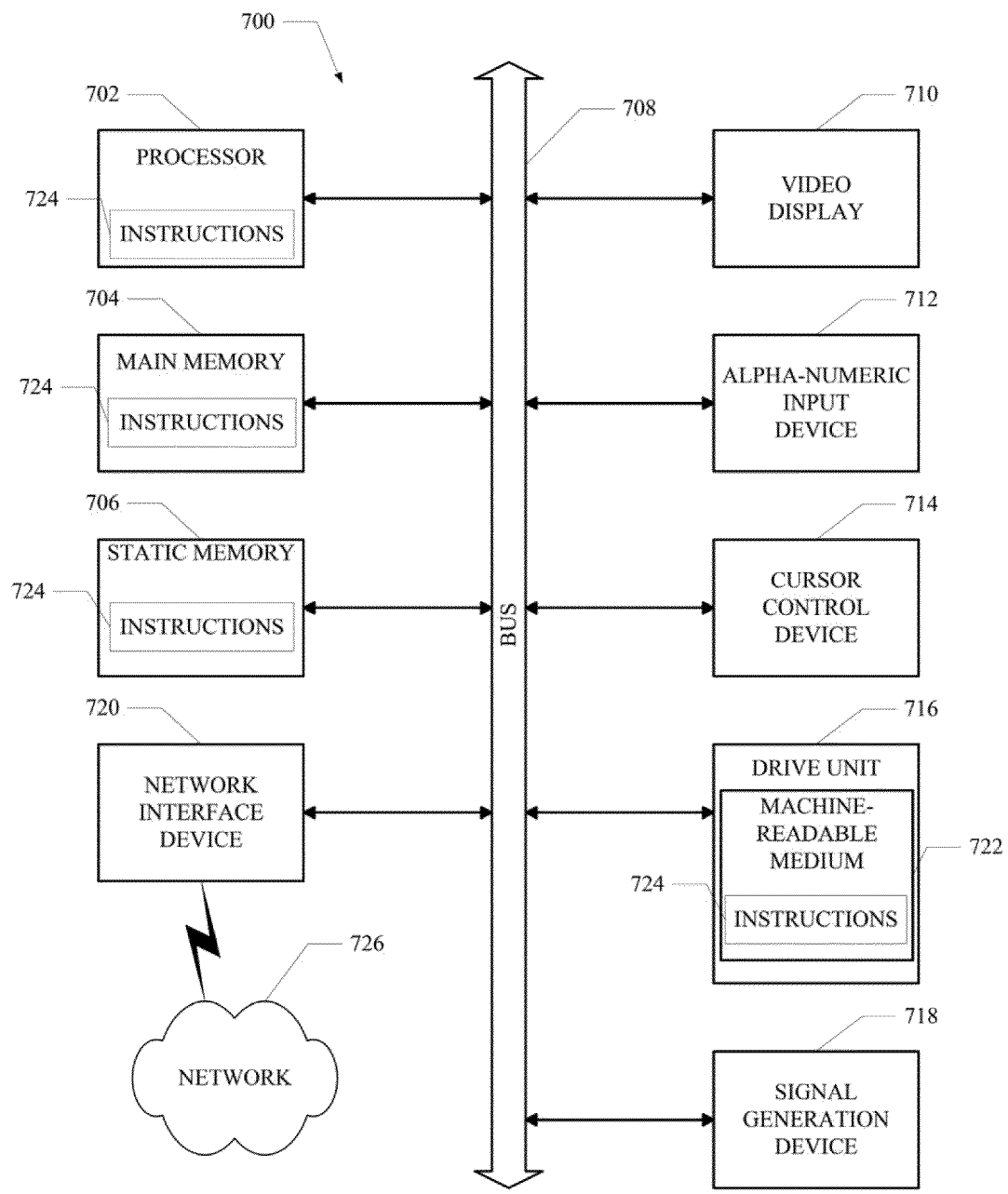
FIG. 10 shows a diagrammatic representation of machine in the example form of a computer system within which a set of instructions when executed may cause the machine to perform any one or more of the methodologies discussed herein.

FIG. 10 shows a diagrammatic representation of a machine in the example form of a computer system 700 within which a set of instructions when executed may cause the machine to perform any one or more of the methodologies discussed herein. In alternative embodiments, the machine operates as a standalone device or may be connected (e.g., networked) to other machines. In as networked deployment, the machine may operate in the capacity of a server or a client machine in server-client network, environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., as central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

Thus, a system and method for remote mail delivery notification is disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
   providing a radio frequency (RF) transmitter on a mail delivery vehicle, the RF transmitter being configured to transmit a signal on a pre-determined frequency within a pre-determined transmitter proximity region;
   providing an RF receiver for a recipient of mail delivered by the mail delivery vehicle, the RF receiver being configured to receive a signal on the pre-determined frequency within a pre-determined receiver proximity region, the RF receiver including a mechanism for rendering an audible or visual alert when signal is received, the RF receiver further including a reset button to clear the alert and reset the RF receiver to receive a new signal;
   positioning the RF receiver so a central mailbox associate with the mail recipient is located within the receiver proximity region, the RF receiver being configured with the receiver proximity region of the RF receiver including the location of the central mailbox;
   automatically activating an alert on the RF receiver when the mail delivery vehicle is located at the central mailbox;
   assigning a scannable code to the central mailbox;
   associating the mail recipient with the scannable code;
   applying an image of the scannable code to the central mailbox;
   scanning the scannable code when mail is delivered to the central mailbox;

causing information indicative of the scannable code to be sent to a central office via a data processor and a wireless network communication when the scannable code is scanned at the central mailbox; and sending a notification to the mail recipient via a network communication when the information indicative of the scannable code is received by the central office.

2. The method as claimed in claim 1 wherein the scannable code is scanned using a mobile device.

3. The method as claimed in claim 1 wherein the scannable code is a barcode.

4. The method as claimed in claim 1 wherein the scannable code is a Quick Response (QR) code.

5. The method as claimed in claim 1 wherein the notification is one from the group: an email, a text message, and a telephone call.

6. The method as claimed in claim 1 including enabling the mail recipient to select a type of the notification.

7. The method as claimed in claim 1 wherein the information indicative of the scannable code is sent to the central office via a software application (app) installed on a mobile device.

\* \* \* \* \*